(12) United States Patent
Andersson et al.

(10) Patent No.: US 6,524,169 B1
(45) Date of Patent: Feb. 25, 2003

(54) METHOD FOR MANUFACTURE OF TUBES OF A ZIRCONIUM-BASED ALLOY

(75) Inventors: Thomas Andersson, Sandviken (SE); Leif Söderqvist, Sandviken (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/857,844

(22) PCT Filed: Nov. 19, 1999

(86) PCT No.: PCT/SE99/02122
§ 371 (c)(1),
(2), (4) Date: Oct. 1, 2001

(87) PCT Pub. No.: WO00/37214
PCT Pub. Date: Jun. 29, 2000

(30) Foreign Application Priority Data

Dec. 9, 1998 (SE) ................................................ 9804262

(51) Int. Cl.[7] ................................................ B24B 7/19
(52) U.S. Cl. ........................................... 451/49; 451/59
(58) Field of Search ............................. 451/51, 59, 49, 451/65, 296, 299, 300, 301

(56) References Cited

U.S. PATENT DOCUMENTS 3,698,229 A * 10/1972 Baksay
3,803,776 A * 4/1974 Shaffer et al.

OTHER PUBLICATIONS

Patent Abstracts of Japan, JP 82–48159 A, Sep. 27, 1996.
Patent Abstracts of Japan, JP 59–28689 A, Feb. 15, 1984.
Patent Abstracts of Japan, JP 54–000197 A, Jan. 5, 1979.

* cited by examiner

Primary Examiner—Eileen P. Morgan
(74) Attorney, Agent, or Firm—Burns, Doane, Swecker & Mathis L.L.P.

(57) ABSTRACT

Method for manufacturing tubes especially for fuel elements and tubes for construction of fuel rod skeletons made of zirconium-based alloy for nuclear reactors and a tube made thereby. The tubes are ground to a surface roughness of $\leq 0.2$ $\mu$mRa with a belt device of SiC-based belts, so-called "dressed" SiC-based belts with cotton back or SiC-cork belts. The tubes may possibly be polished after grinding with a wheel to a surface roughness $<0.25$ $\mu$mRa.

6 Claims, 1 Drawing Sheet

METHOD FOR MANUFACTURE OF TUBES OF A ZIRCONIUM-BASED ALLOY

Figure 1:
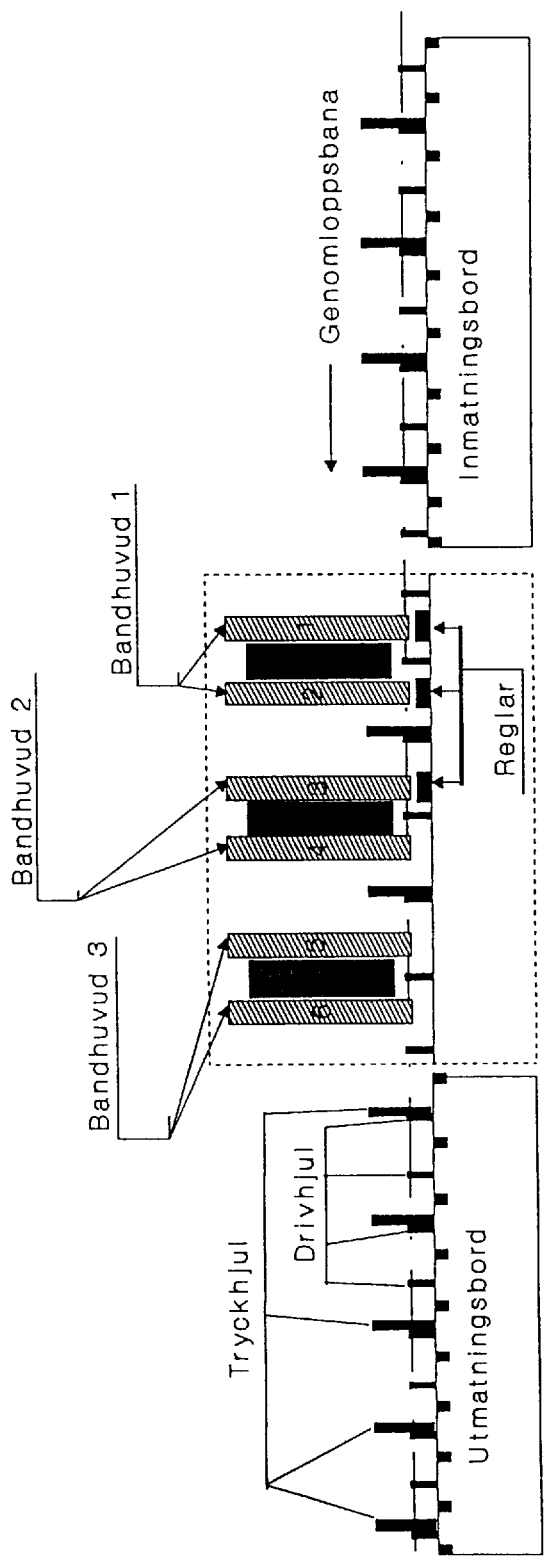
Figure 1:
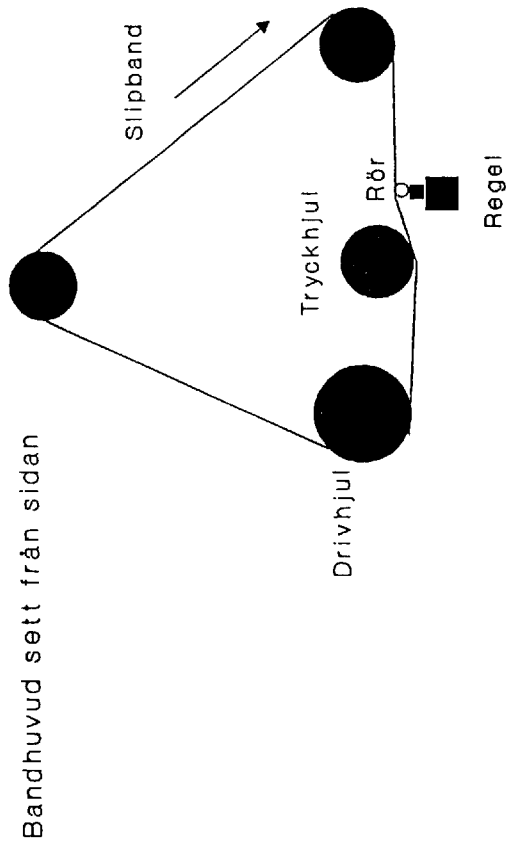

This application is the national state application of PCT/SE99/02122, filed Nov. 19, 1999, that designated the United States of America, and which claims priority Swedish Application No. 9804262-5, filed on Dec. 9, 1998, and which PCT application was published in English on Jun. 29, 2000.

FIELD OF THE INVENTION

The present invention is directed to a method of ultrasmooth grinding of tubes of a zirconium-based alloy. The zirconium-based alloy can be used for cladding of fuel in thermal rectors. The method includes conventional manufacturing of tubes from the stadium of ingot to the final annealed tubes, ultrasmooth grinding and after that non-destructive and destructive testing according to conventional techniques. The method can be used in the manufacture of cladding tubes for fuel rods for boiling water reactors and compressed water reactors. Additionally, the invention has application in the area of construction tubes, such as guide thimble tubes, and instrumentation tubes for fuel rods for PWR and construction tubes for fuel rods for BWR.

BACKGROUND OF THE INVENTION

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

Among the alloys that are most customarily used in the manufacture of cladding tubes for fuel rods for boiling water reactors (BWR) and compressed water reactors (PWR), alloys such as "Zircaloy" are especially known, amongst which Zircaloy-2 and Zircaloy-4 have the following composition, in accordance with ASTMB 811:

|  | Element | Weight % |
| --- | --- | --- |
| Zircaloy-2 | Sn | 1.2–1.7 |
|  | Fe | 0.07–0.20 |
|  | Cr | 0.05–0.15 |
|  | Ni | 0.03–0.08 |
|  | Zr | balance + impurities |
| Zircaloy-4 | Sn | 1.2–1.7 |
|  | Fe | 0.18–0.24 |
|  | Cr | 0.07–0.13 |
|  | Zr | balance + impurities |

In addition to the above, the content of oxygen for these alloys should be between 900 and 1600 ppm for cladding tubes and construction tubes for fuel element skeletons. Furthermore, Zircaloy-2 and Zircaloy-4 are commercially used with insignificant, but well-defined additives of Si and/or C, preferably in contents of 50–120 ppm Si and 80–270 ppm C.

These zirconium-based alloys are chosen because of their nuclear properties, foremost being the low neutron absorption cross-section, which imparts a low ability to absorb neutrons, mechanical properties, and corrosion resistance in water and steam at high temperatures and under radiation.

The development goes to meet longer service times for fuel rods, i.e., to allow a higher extent of rates of burn-up. It has been proved thereby to be of importance to be able to improve the corrosion resistance to not exceed the design related maximum oxide thickness of the zirconium-base alloyed fuel rods. Furthermore, a very important factor is to minimize the activity build-up on the fuel, i.e., on the outer surface of the fuel rods. Since the service time is extended, there are higher demands made on the outer surface of the fuel rods, such as in reference to their condition and surface roughness. Experience has shown that a pickled and preautoclaved surface with fine surface roughness reduces the contribution to deposition of activity-contributing elements on the surface of the fuel rod as compared to fuel rods with conventional surface finishes with a coarser surface roughness.

It has been a widely used technique to manufacture cladding and construction tubes of zirconium alloys by a manufacturing process that includes hot working of an ingot to a bar, quenching from the β area, machining to a hollowed work piece, extrusion of the hollowed workpiece in a α-area to a tube hollow, reducing in several operations by cold rolling to substantially final dimension with a recrystallization annealing in the α-area for each cold rolling operation. The cold rolled tube, substantially in the final dimension, will be vacuum annealed in the α-area at a temperature in the interval of 450–650° C. and surface-conditioned by some of the methods blasting or pickling. Alternatively, a combination of these methods can be used. Also, the tube can be surface-conditioned on the outside by mechanical treatment in form of one, or a combination of, the methods belt grinding, belt polishing, contact grinding and polishing.

The object of the present invention is to provide an improved method for the manufacturing of tubes of zirconium alloys for cladding of fuel and for construction of fuel rods for skeletons, including mechanical treatment of the outer surface that, after the final vacuum annealing, meet the requirements for fine surface roughness in order to minimize activity build-up. Certainly, a fine surface roughness (and by that, a low activity build-up) as above mentioned could be performed by which the outer surface of the tubes after the final vacuum annealing will be pickled and preautoclaved in high-pressure steam. However, several disadvantages are found with this method. At first the pickling must be done in a mixture of nitric acid and hydrofluoric acid. This mixture is disadvantageous in regards to the working environment and also the handling of the consumed acid, which can contribute to an unwanted increase of the environmental pollution. At second the autoclaving contributes to corrosion-produced hydrogen, which will be absorbed by the zirconium alloys. This causes the cladding and construction tubes to have an undesirable shortening of the total operating time, since the autoclave produced hydrogen adds to the hydrogen that will be absorbed during operation.

SUMMARY OF THE INVENTION

A method is provided for manufacturing tubes especially for fuel elements and tubes for construction of fuel rod skeletons made of zirconium-based alloy for nuclear reactors. Tubes made by the method are ground to a surface roughness of $\leq 0.2$ $\mu$mRa with a belt device of SiC-based belts, so-called "dressed" SiC-based belts with cotton back or SiC-cork belts. The tubes may possibly be polished after grinding with a wheel to a surface roughness $\leq 0.25$ $\mu$mRa.

BRIEF DESCRIPTION OF THE DRAWING FIGURES

Other objects and advantages of the invention will become apparent from the following detailed description of preferred embodiments in connection with the accompanying drawings in which like numerals designate like elements and in which:

FIG. 1 is an exemplary belt-grinding machine with 3 belt heads

DETAILED DESCRIPTION OF THE INVENTION

According to the present invention, it has surprisingly been found possible to manufacture cladding tubes and construction tubes of zirconium alloys for nuclear reactors according to a method that contains ultrasmooth grinding and that gives a considerably finer surface roughness on the outer surface than that for conventional manufactured tubes and, further, gives a surface roughness that is considerably finer than that represented by pickled and preautoclaved tubes. Further it has been found that tubes with an ultrasmooth ground surface have a corrosion rate under autoclave testing in steam at 415° C. that is approximately 20% lower than for conventional manufactured tubes. This subsequent result is entirely unexpected.

The invention provides a method of manufacturing cladding tubes and construction tubes of zirconium-based alloy for nuclear rectors, in which the zirconium-based alloy is manufactured according to conventional and known methods including melting, hot working and β quenching before extrusion, extrusion, cold rolling with intermediate recrystallization annealing, final vacuum annealing, inner surface conditioning and after which the zirconium-based alloy will be ultrasmooth ground instead of going through a conventional outer surface conditioning.

The ultrasmooth grinding will be done in a belt grinding machine, consisting of a feeder, a grinding machine and a feeding out device. The grinding machine consists of a number of belt heads. Each belt head consists of two belt units, operated of one and the same engine. The belt unit consists of a driving wheel and a steering wheel, which runs and stretches the grinding belt and also a pressure wheel, which presses down the belt towards the tube while grinding. Removal of material from the tube-surface will be adjusted by vertically adjusting of each belt head. The belt grinding machine can be equipped with up to 5 belt heads, i.e. 10 pieces of belt units. The ultrasmooth grinding will be performed with a sequence of belts consisting of conventional abrasive SiC-belts, conventional polishing SiC-cork belts, and also so called "dressed" SiC-based grinding belts with cotton back. FIG. 1 shows a belt-grinding machine with 3 belt heads.

The zirconium-based alloy consists preferably of a zirconium-tin alloy. For example, the alloys can be a zirconium-tin alloy known under the trade marks Zircaloy-2 and Zircaloy-4, that have a content of alloying elements in the range between 1.2–1.7% for tin, 0.07–0.24% for iron, 0.05–0.15% for chromium, 0–0.08% for nickel and 0.09–0.16% for oxygen, small additions of silicon and carbide, the balance zirconium and optionally occurring inevitable impurities. Additionally, the alloy can be of type Zircaloy-3 with 0.5–1.0% Sn, 0.3–0.6% Fe and 0–0.2% Cr and supplements and occurring impurities corresponding to Zircaloy-2 and -4. The contents in the application refer to percentage by weight.

Preferably, Zircaloy-2 contains 1.2–1.7% Sn, 0.07–0.20% Fe, 0.05–0.15% Cr, 0.03–0.08% Ni and 0.09–0.16% O.

Preferably, Zircaloy-4 contains 1.2–1.7% Sn, 0.18–0.24% Fe, 0.07–0.13% Cr, 0.09–0.16% O, no Ni.

The invention will be explained in detail by describing one of the embodiments.

Cladding tubes of Zircaloy-2 were manufactured according to the conventional methods regarding to all process steps from melting of the ingot to the final annealing at 575° C. After the conventional surface conditioning of the inner surface, the product is exposed to ultrasmooth grinding at which the product will be ground in a grinding machine, consisting of 6 belt units. In order to obtain the optimal surface roughness the tubes are exposed to two grinding passages in the machine with the following sequence of belts:

Pass 1

| | |
|---|---|
| 2 × 320 grit, | conventional SiC-belts |
| 2 × 400 grit, | conventional SiC-belts |
| 2 × 600 grit, | "dressed" SiC-based belts with cotton back |

Pass 2

| | |
|---|---|
| 2 × 800 grit, | "dressed" SiC-based belts with cotton back |
| 2 × 1000 grit, | conventional SiC-cork belts |
| 2 × 1200 grit, | conventional SiC-cork belts |

After the ultrasmooth grinding the tubes were split into two lots. One of the lots was exposed to another surface treatment in the form of polishing with a 800-grit wheel.

The surface roughness of the tubes was measured. For the tube manufactured according to the present invention, it was observed that the surface roughness after ultrasmooth grinding is ≦0.2 μmRa and the surface roughness after ultrasmooth grinding and polishing with 800-grit wheel is ≦0.25 μmRa. The surface roughness for the conventional manufactured tubes is in the range 0.3–0.5 μmRa. For conventional manufactured tubes exposed to an outside pickling as well as autoclave treatment the surface roughness is ≦0.25 μmRa.

Under corrosion testing in steam at 415° C. for 90 days—a test that simulates the conditions regarding the resistance against general corrosion during reactor operations—tubes, which were manufactured according to the present invention, exhibit a better resistance against general corrosion than conventional manufactured tubes. The conventional manufactured tubes have proven good resistance against general corrosion and were included in the trial for comparison. Test results for the corrosion rate measured between the exposing time of 60 and 90 days expressed in mg/dm²/day, is as follows:

| | |
|---|---|
| Ultrasmooth ground tubes: | 0.53 |
| Ultrasmooth ground plus polished tubes: | 0.60 |
| Conventional manufactured tubes: | 0.67 |

The ultrasmooth grinding leads to a 20% decrease of the corrosion rate 20% and ultrasmooth grinding plus polishing leads to a 10% decrease, compared with conventional manufactured tubes.

Although the present invention has been described in connection with exemplary embodiments thereof, it will be appreciated by those skilled in the art that additions, deletions, modifications, and substitutions not specifically described may be made without departing from the spirit and scope of the invention as defined in the appended claims.

What is claimed is:

1. A method of grinding a zirconium-based alloy tube to provide a surface roughness of the tube of $\leq 0.2$ μmRa, the method comprising:
   (i) subjecting the tube to a first grinding pass through a first sequence of Si—C-based abrasive belts, the belts having a grit size of 320–600; and
   (ii) subjecting the tube to a second subsequent grinding pass through a second sequence of Si—C-based abrasive belts having a grit size of 800–1200.

2. The method according to claim 1, wherein steps (i) and (ii) are performed with a grinding machine with 6 to 10 belt units.

3. The method of claim 1, wherein the Si—C-based belts comprise at least one of: Si—C-cork belts or SiC-based belts with a cotton back.

4. The method according to claim 1, further comprising polishing the surface with a wheel to a surface roughness of <0.2 μmRa.

5. The method according to claim 4, wherein the polishing is performed with a wheel with grit size 600–1200.

6. The method according to claim 1, wherein steps (i) and (ii) are performed before or after surface conditioning of an inner surface of the tube.

* * * * *